United States Patent
Chen et al.

(10) Patent No.: US 10,261,357 B2
(45) Date of Patent: Apr. 16, 2019

(54) DISPLAYS WITH COLOR FILTER MATERIAL IN BORDER REGIONS

(71) Applicant: Apple Inc., Cupertino, CA (US)

(72) Inventors: Cheng Chen, San Jose, CA (US); Young Cheol Yang, Sunnyvale, CA (US); Chul Ho Park, Paju-Si (KR)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 14/891,941

(22) PCT Filed: May 14, 2013

(86) PCT No.: PCT/US2013/041007
§ 371 (c)(1),
(2) Date: Nov. 17, 2015

(87) PCT Pub. No.: WO2014/185894
PCT Pub. Date: Nov. 20, 2014

(65) Prior Publication Data
US 2016/0131941 A1 May 12, 2016

(51) Int. Cl.
*G02F 1/1335* (2006.01)
*G02F 1/1362* (2006.01)
(Continued)

(52) U.S. Cl.
CPC ....... *G02F 1/133514* (2013.01); *G02B 5/223* (2013.01); *G02F 1/1368* (2013.01);
(Continued)

(58) Field of Classification Search
CPC ......... G02F 1/133502; G02F 1/133512; G02F 1/133514; G02F 1/133516; G02F 1/136286; G02F 1/1368; G02F 2001/133388; G02F 2001/133519; G02F 2001/133565; G02F 2202/023; G02F 2001/133302; G02F 2001/1333; G02B 5/223; G02B 1/111; G02B 5/201
(Continued)

(56) References Cited

U.S. PATENT DOCUMENTS 5,045,418 A * 9/1991 Fukuyoshi ........ G02F 1/133345
349/106
5,910,829 A * 6/1999 Shimada ........... G02F 1/133512
349/106
(Continued)

FOREIGN PATENT DOCUMENTS

CN 101101401 A 1/2008
CN 101995697 A 3/2011
(Continued)

*Primary Examiner* — Hoan C Nguyen
(74) *Attorney, Agent, or Firm* — Treyz Law Group, P.C.; David K. Cole

(57) ABSTRACT

An electronic device may have a display such as a liquid crystal display. A color filter layer may be formed on a display layer such as a transparent substrate layer. The color filter layer may include an array of color filter elements on a central portion of a surface of the transparent substrate layer. The color filter layer may include a peripheral color filter of a single color that at least partially surrounds the color filter elements on the central portion of the inner surface. In an inactive portion of the display, an opaque masking material may be formed over the peripheral color filter. In an active portion of the display the opaque masking material may form a grid that covers interfaces between adjacent color filter elements. The peripheral color filter may completely cover the surface of the substrate in the entire inactive portion of the display.

20 Claims, 7 Drawing Sheets

(51) Int. Cl.
  *G02B 5/22* (2006.01)
  *G02F 1/1368* (2006.01)
  *G02B 1/111* (2015.01)
  *G02B 5/20* (2006.01)
  *G02F 1/1333* (2006.01)

(52) U.S. Cl.
  CPC .. *G02F 1/133502* (2013.01); *G02F 1/133509* (2013.01); *G02F 1/133512* (2013.01); *G02F 1/133516* (2013.01); *G02F 1/136209* (2013.01); *G02F 1/136286* (2013.01); *G02B 1/111* (2013.01); *G02B 5/201* (2013.01); *G02F 2001/133302* (2013.01); *G02F 2001/133388* (2013.01); *G02F 2001/133519* (2013.01); *G02F 2001/133565* (2013.01); *G02F 2001/136222* (2013.01); *G02F 2202/023* (2013.01)

(58) Field of Classification Search
  USPC .......................................................... 349/106
  See application file for complete search history.

(56) References Cited

U.S. PATENT DOCUMENTS

| | | | |
|---|---|---|---|
| 5,936,694 A * | 8/1999 | Suzuki | G02F 1/133345 349/108 |
| 6,057,900 A * | 5/2000 | Ono | G02F 1/1339 349/106 |
| 2002/0196393 A1* | 12/2002 | Tashiro | G02F 1/1303 349/106 |
| 2003/0137631 A1 | 7/2003 | Nakayoshi et al. | |
| 2004/0126678 A1 | 7/2004 | Baek et al. | |
| 2007/0291212 A1 | 12/2007 | Asada et al. | |
| 2007/0291335 A1 | 12/2007 | Lee et al. | |
| 2010/0033658 A1* | 2/2010 | Tsao | G02B 5/201 349/106 |
| 2010/0141874 A1 | 6/2010 | Morita | |
| 2011/0199549 A1* | 8/2011 | Washizawa | G02B 5/201 349/15 |
| 2011/0249339 A1 | 10/2011 | Horie et al. | |
| 2013/0141678 A1* | 6/2013 | Chin | G02F 1/133345 349/106 |
| 2013/0250227 A1* | 9/2013 | Kira | G02F 1/1339 349/153 |
| 2013/0293802 A1* | 11/2013 | Chae | G02B 5/201 349/58 |

FOREIGN PATENT DOCUMENTS

| | | |
|---|---|---|
| EP | 0884626 | 12/1998 |
| KR | 10-2009-0091675 A | 8/2009 |
| TW | 201307906 A | 2/2013 |
| WO | 2013008679 | 1/2013 |
| WO | 2013008679 A1 | 1/2013 |
| WO | 2013074195 | 5/2013 |

* cited by examiner

DISPLAYS WITH COLOR FILTER MATERIAL IN BORDER REGIONS

BACKGROUND

This relates generally to electronic devices and, more particularly, to electronic devices with displays.

Electronic devices such as computers and cellular telephones may have displays. In a typical display such as a liquid crystal display, an array of display pixels is used to display images for a user. The array of display pixels may be formed in an active display region of the display. The display may also include a peripheral border region that is inactive.

To provide a display such as a liquid crystal display with the ability to display color images, an array of color filter elements is often aligned with the array of display pixels. The color filter layer is formed on a glass layer of the display. A typical color filter array often contains red, blue, and green color filter elements (e.g., elements that pass red, blue, and green light respectively). Portions of the black masking layer are also sometimes formed on the glass layer of the display in the inactive area around the periphery of the color filter array.

At the interface of a glass layer and other display components such as color filter elements and black masking layers, reflections of ambient light may arise. These reflections are caused by differences in the indices of refraction of the glass layer, the color filter elements and the black masking layer. Because the black masking layer and the color filter elements have different indices of refraction, these reflections at the inner surface of the glass layer can make the inactive peripheral region of the display stand out in contrast to the active portion of the display. With traditional display designs, it can be challenging to reduce reflections.

It would therefore be desirable to be able to provide electronic devices with improved displays such as electronic devices with minimized display reflections.

SUMMARY

An electronic device may have a display such as a liquid crystal display. The display may have multiple layers of material such as a display cover layer, a color filter layer and a thin-film transistor layer. A layer of liquid crystal material may be interposed between the color filter layer and the thin-film transistor layer.

The color filter layer may be formed from color filter elements formed from colored photoresist on a sheet of transparent rigid material such as glass or plastic.

An opaque masking layer may be formed on a display layer such as the color filter layer. The display may have a central active area such as a rectangular active area. Display pixels in the active area may present images to a user of the electronic device. The active area may be surrounded by an inactive area. For example, the active area may be surrounded by an inactive area that has the shape of a rectangular ring. Color filter elements may be formed over the display pixels in the active area.

In the inactive portion of the display, the opaque masking layer is formed over color filter material having a single color such as a rectangular peripheral color filter formed from photoresist such as blue photoresist. The opaque masking material and the peripheral color filter may form a rectangular border that surrounds the active area. The peripheral color filter is interposed between the opaque masking layer and a surface of the transparent rigid layer in the inactive area and is sometimes referred to herein as a peripheral color filter or a rectangular color filter ring. The peripheral color filter may cover the surface of the transparent rigid layer in substantially all of the inactive area.

Reflections may be reduced within the inactive border region of the display by forming the peripheral color filter interposed between the opaque masking layer and the transparent rigid layer in the inactive border region.

During manufacturing of the display, photoresist such as blue photoresist may be deposited and patterned on a sheet of rigid transparent material such as a sheet of glass. The patterned blue photoresist may form blue color filter elements and a rectangular blue color filter ring around the blue color filter elements on the glass sheet.

Color filter materials for color filter elements of other colors such as red photoresist and green photoresist may be deposited and patterned on the glass sheet to form a set of red and green color filter elements that are surrounded by the blue color filter ring. Opaque masking material may be deposited over the color filter elements and the blue color filter ring. The opaque masking material may be patterned to cover the blue color filter ring and to form a black matrix over interfacing portions of the color filter elements.

Further features of the invention, its nature and various advantages will be more apparent from the accompanying drawings and the following detailed description of the preferred embodiments.

DETAILED DESCRIPTION

Figure 1:
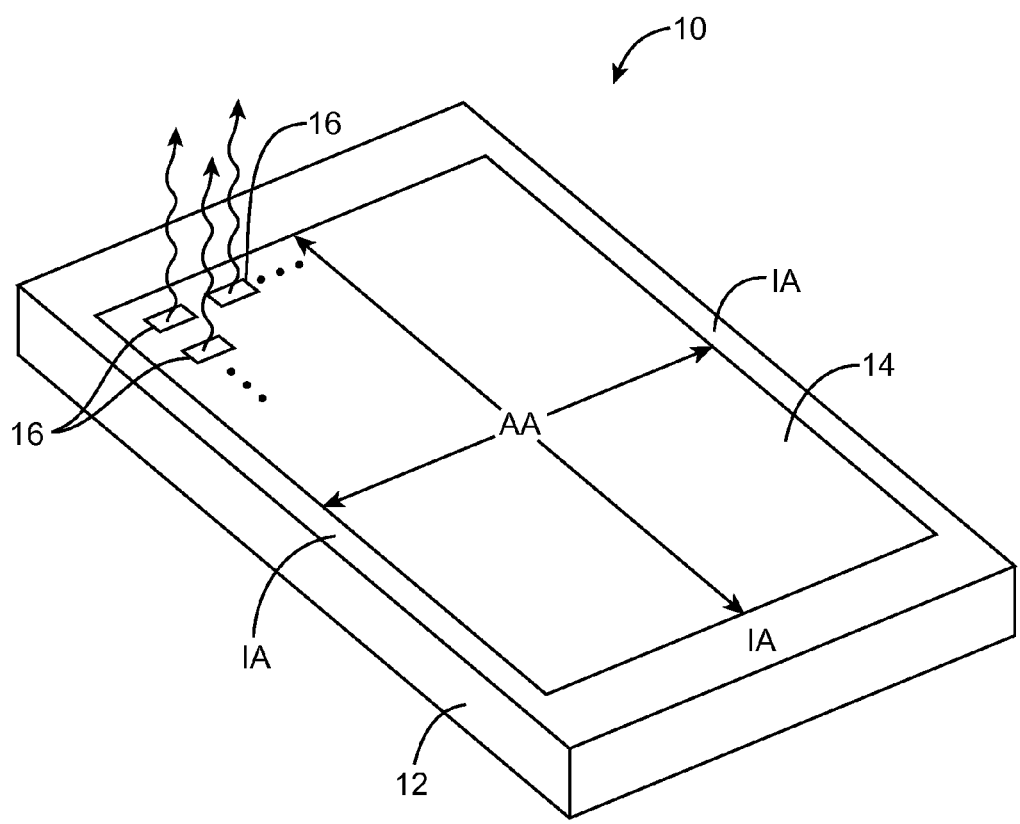
FIG. 1 is a perspective view of an illustrative electronic device with a display in accordance with an embodiment of the present invention.

An illustrative electronic device of the type that may be provided with a display is shown in FIG. 1. Electronic device 10 may be a computer, a laptop computer, a tablet computer, a somewhat smaller portable device such as a wrist-watch device, pendant device, or other wearable or miniature device, a cellular telephone, a media player, a gaming device, a navigation device, a computer monitor, a television, or other electronic equipment.

As shown in FIG. 1, device 10 may include a display such as display 14. Display 14 may include display pixels 16 formed from liquid crystal display (LCD) components or other suitable display pixel structures. Arrangements in which display 14 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Display 14 may have an active area such as active area AA and an inactive area such as area IA. Active area AA may be, for example, a rectangular region in the center of display 14 in which display pixels 16 are actively used to display images for a user of device 10. Inactive area IA may be devoid of active display pixels. In the example of FIG. 1, inactive area IA has the shape of a rectangular ring, surrounding the periphery of active area AA of display 14.

Circuitry and other components may sometimes be formed in inactive area IA. To hide the circuitry and other components from view by a user of device 10, inactive area IA may sometimes be provided with an opaque mask. The opaque mask may be formed over color filter material such as a peripheral color filter (e.g., a blue peripheral color filter) that covers substantially all of a surface of a color filter substrate in inactive area IA.

The opaque mask can be formed from an opaque material such as a black material or may be formed from opaque masking materials of other colors. Configurations in which the opaque masking material in display 14 has a black appearance are sometimes described herein as an example. This is, however, merely illustrative. Opaque masking layers in device 10 may have any suitable colors.

Configurations in which inactive region IA extends along all four edges of a rectangular active region AA are described herein as an example.

Figure 2:
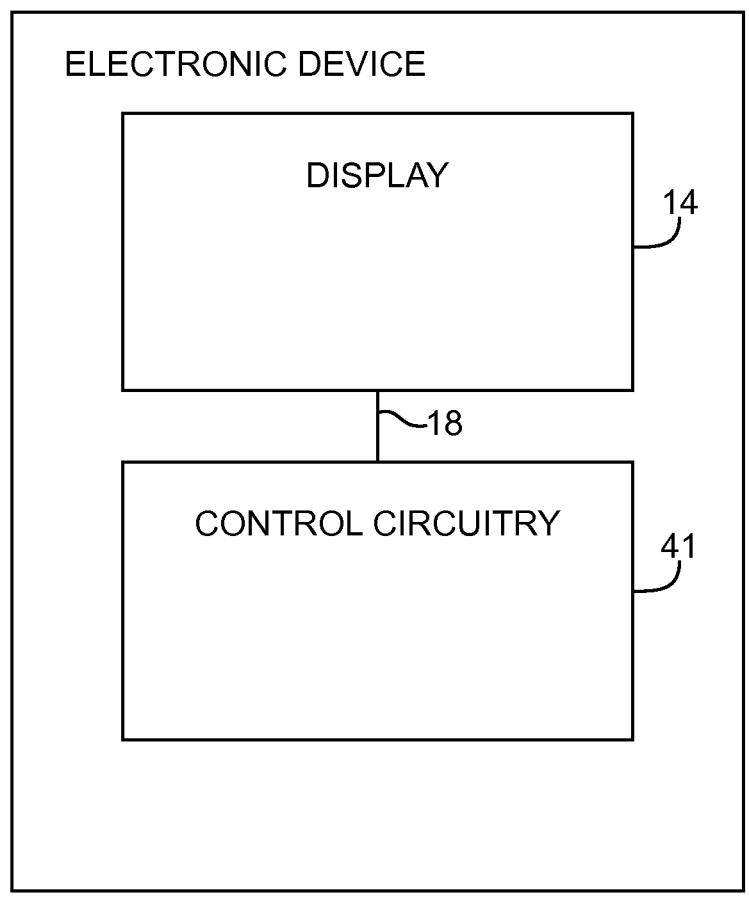
FIG. 2 is a schematic diagram of an illustrative electronic device with a display in accordance with an embodiment of the present invention.

A schematic diagram of device 10 is shown in FIG. 2. As shown in FIG. 2, electronic device 10 may include storage and processing circuitry such as control circuitry 41. Control circuitry 41 may include one or more different types of storage such as hard disk drive storage, nonvolatile memory (e.g., flash memory or other electrically-programmable-read-only memory), volatile memory (e.g., static or dynamic random-access-memory), etc.

Processing circuitry in storage and processing circuitry 41 may be used in controlling the operation of display pixels associated with display 14 and in controlling other aspects of the operation of device 10. The processing circuitry may be based on a processor such as a microprocessor and other suitable integrated circuits. With one suitable arrangement, storage and processing circuitry 41 may be used to run software on device 10 such as software that makes controls display pixels 16, etc.

Control circuitry 41 may be coupled to display 14 over path 18. Path 18 may be formed from a flexible printed circuit, a wire bond, or other electrical coupling mechanism or structure.

Figure 3:
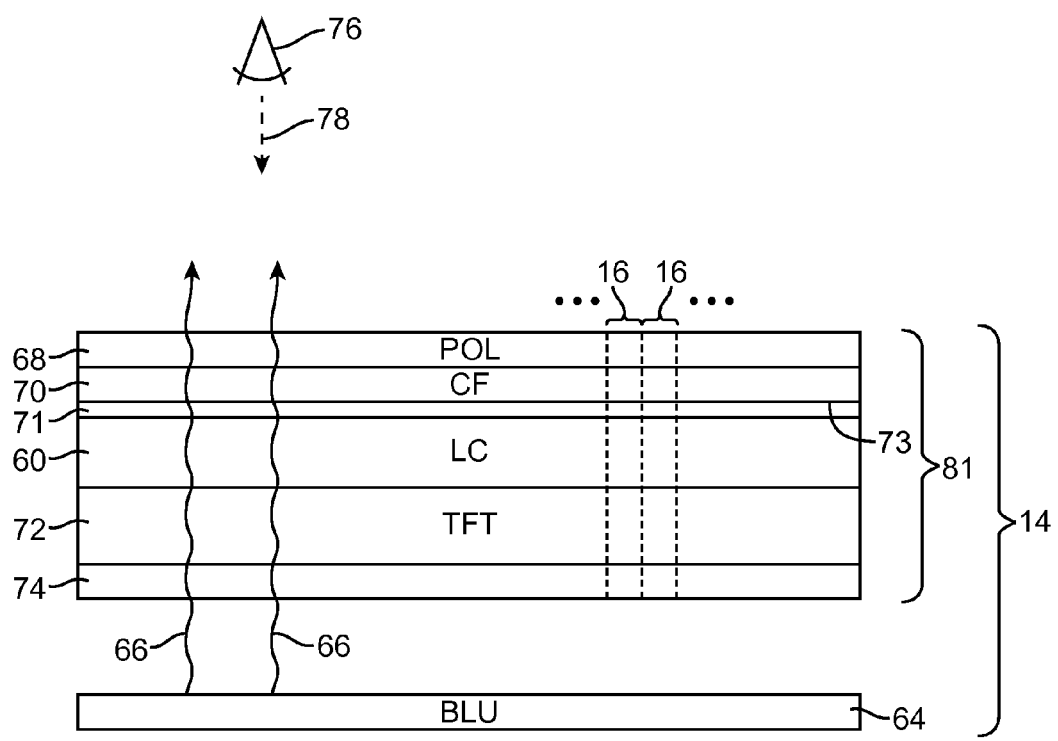
FIG. 3 is a cross-sectional side view an illustrative liquid crystal display in accordance with an embodiment of the present invention.

Display 14 may be, for example, a liquid crystal display such as display 14 of FIG. 3. As shown in FIG. 3, backlight structures 64 (sometimes referred to as a backlight unit (BLU)) may be used to produce backlight 66 that travels upwards (outwards) in dimension Z through display layers 81 of display 14. Display layers 81 may include an upper polarizer layer such as layer 68 and a lower polarizer layer 74.

Upper polarizer layer 68 may be attached to one or more substrate layers such as color filter substrate 70. Lower polarizer layer 74 may be attached to one or more substrate layers such as thin-film-transistor layer 72. Layers 70 and/or 72 may be formed from transparent substrates such as glass, plastic, or other materials. During manufacturing of displays such as display 14, layers such as layers 70 or 72 of an individual display may be cut from a sheet of transparent substrate material such as a sheet of glass.

Display 14 may have additional display layers such as layer 71 formed on interior surface 73 of layer 70. Layer 71 may include layers of color filter material, planarization layers, patterned layers of opaque masking material, layers that include color filter elements and opaque masking material, clear layers, or other suitable display layers. For example, color filter elements may be formed on interior surface 73 of layer 70 in active region AA, a peripheral color filter of a single color may be formed on surface 73 of layer 70 in inactive region IA, and opaque masking material may be formed over the peripheral color filter in inactive region IA and over and/or between portions of the color filter elements on interior surface 73 in active region AA.

Layer 72 of display 14 may include thin-film transistors formed on a transparent substrate such as a layer of glass. An array of electrodes may be controlled by the thin-film transistor circuitry in thin-film transistor layer 72. Thin-film transistor circuitry may include, as examples, amorphous silicon transistor circuitry or polysilicon transistor circuitry. Thin film transistor circuitry may also include interconnect lines to connect electrodes formed from conductive materials such as indium tin oxide and metal to thin-film structures such as thin-film transistors. Thin-film transistor circuitry may be used in adjusting voltages in display pixels 16 in active area AA, thereby selectively lightening and darkening pixels 16 and presenting an image to a user of device 10 such as viewer 76, viewing display 14 in direction 78.

As light 66 passes through lower polarizer 74, lower polarizer 74 polarizes light 66. As polarized light 66 passes through liquid crystal material 60, liquid crystal material 60 may rotate the polarization of light 66 by an amount that is proportional to the electric field through liquid crystal material 60. If the polarization of light 66 is aligned in parallel with the polarization of polarizer 68 in a given display pixel 16, the transmission of light 66 through layer 68 in that pixel will be maximized. If the polarization of light 66 is aligned so as to run perpendicular to the polarization of polarizer 68 in a given pixel 16, the transmission of light 66 through layer 68 will be minimized (i.e., light 66 will be blocked) in that pixel.

Backlight unit 64 may include a light source such as a light-emitting diode array for producing backlight 66. Polarizers such as polarizer 68 and polarizer 74 may be formed from thin polymer films. For example, polarizer 68 may be formed from polymer film and an associated adhesive layer such as optically clear adhesive layer. The display layers that are used in the configuration of FIG. 3 are merely illustrative.

Figure 4:
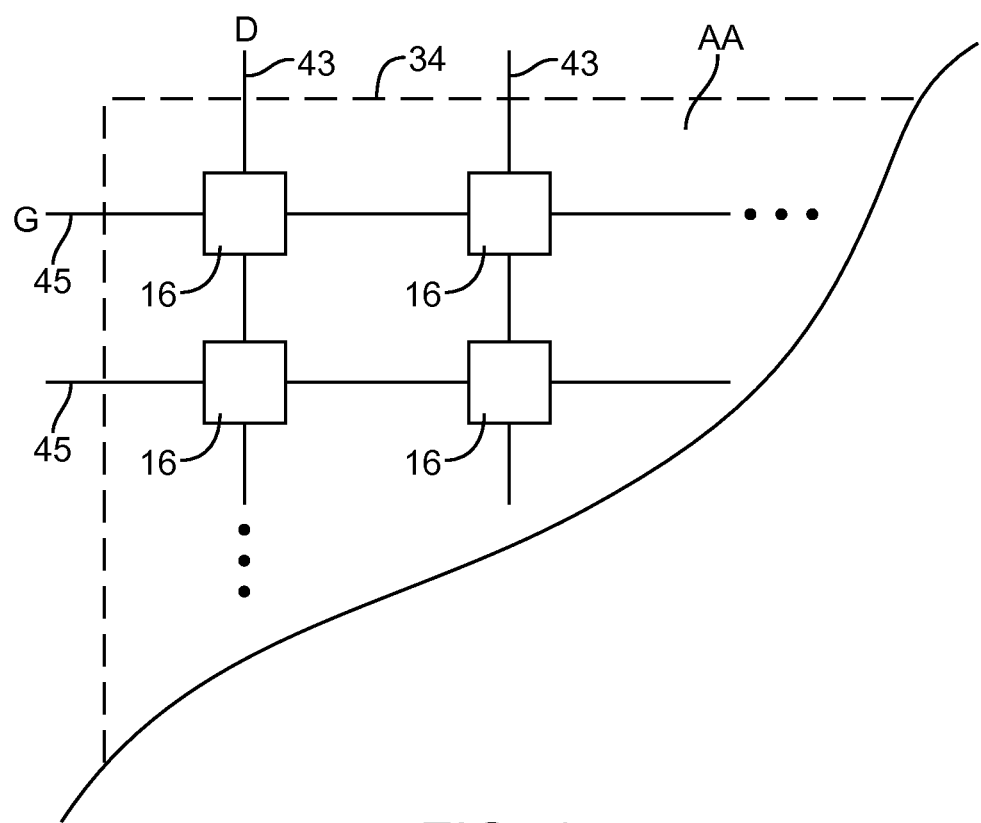
FIG. 4 is a diagram of an illustrative array of display pixels in an active region of a display in accordance with an embodiment of the present invention.

A diagram showing circuitry of the type that may be used in operating display 14 is shown in FIG. 4

Display 14 may include a pixel array such as pixel array 34. Pixel array 34 may be controlled using control signals produced by display driver circuitry such as one or more integrated circuits (ICs). A display driver integrated circuit may be mounted on an edge of thin-film transistor substrate layer 72 (see FIG. 3).

During operation of device 10, control circuitry such as control circuitry 41 of FIG. 2 may provide data to the display driver integrated circuit. The display driver may produce control signals such as start pulse signals and provide the control signals to display pixels 16.

Pixel array 34 may contain rows and columns of display pixels 16 that collectively form an active region AA. The circuitry of pixel array 34 may be controlled using signals such as data line signals on data lines 43 and gate line signals on gate lines 45.

Pixels 16 in pixel array 34 may contain thin-film transistor circuitry (e.g., polysilicon transistor circuitry or amorphous silicon transistor circuitry) and associated structures for producing electric fields across liquid crystal material 60 in display 14. The thin-film transistor structures that are used in forming pixels 16 may be located on a substrate (sometimes referred to as a thin-film transistor layer or thin-film transistor substrate). The thin-film transistor (TFT) layer may be formed from a planar glass substrate, a plastic substrate, or a sheet of other suitable substrate materials.

Figure 5:
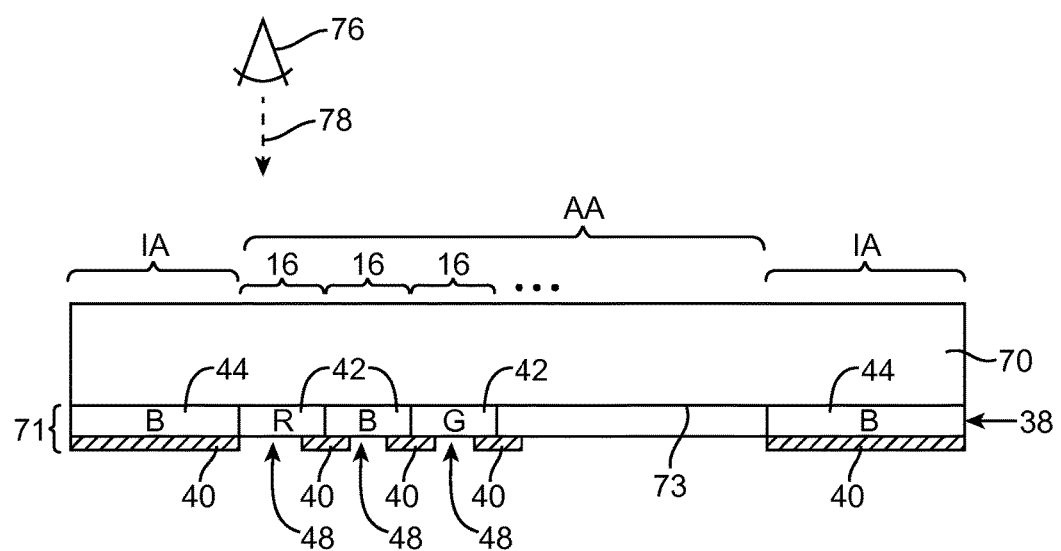
FIG. 5 is cross-sectional side view of a portion of a display color filter layer having an opaque masking layer that is formed over a peripheral color filter in an inactive border region of the display in accordance with an embodiment of the present invention.

As shown in FIG. 5, layer 71 on interior surface 73 of transparent substrate layer 70 of display 14 may include a layer of color filter material such as layer 38. Color filter material layer 38 may include an array of color filter elements 42 in active area AA and a peripheral color filter 44 on surface 73 in inactive area IA. Peripheral color filter 44 may cover surface 73 in substantially all of inactive area IA of display 14.

Color filter elements 42 may form an array of color filter elements 42 on inner surface 73 of substrate 70 in active area AA. Color filter elements 42 may include, for example, red color filter elements R, green color filter elements G, and blue color filter elements B. The array of color filter elements in layer 38 may be used to provide display 14 with the ability to display color images.

Interfaces between adjacent color filter elements 42 may be covered by portions of opaque masking material 40. Opaque masking material 40 may be formed from a dark substance such as a polymer that contains a black pigment and is therefore sometimes referred to as a black mask.

In active region AA, portions of color filter elements 42 that are aligned with display pixels 16 may be free of black mask 40 so that light such as backlight 66 (FIG. 3) may pass through color filter elements 42. Black mask 40 may form a grid of relatively thin lines (sometimes referred to as a black matrix) over interfacing portions of adjacent color filter elements in active region AA that visually separates individual display pixels 16.

The opaque masking material may have a pattern of openings 48 aligned with pixels 16 in active area AA. Openings 48 may form an array of rectangular holes in which color filter elements 42 are formed. In inactive region IA, black masking material 40 is formed over peripheral color filter 44 to form a peripheral opaque mask that serves as an opaque border for display 14. The opaque mask and additional peripheral color filter in inactive area IA may have a rectangular ring shape that surrounds a central rectangular active area AA (as an example).

Peripheral color filter 44 may be formed from color filter material (e.g., colored photoresist) that extends continuously across inactive region IA. Peripheral color filter 44 in inactive area IA may be formed from color filter material (e.g., colored photoresist) of a single color such as blue.

Ambient light may reflect from the interfaces of the layers in display 14, leading to the potential for undesired reflections. Light reflections in inactive region IA may be reduced by forming additional color filter material 44 between opaque masking material 40 and inner surface 73 of substrate 70 in inactive portion IA.

Because the index of refraction of the combination of black masking material 40 over color filter material 44 on surface 73 may be similar to the index of refraction of black masking material 40 and color filter elements 42 in the active area, display 14 may appear to a viewer 76 viewing display 14 in direction 78 as a seamless display without a visible border between active area AA and inactive area IA.

Figure 6:
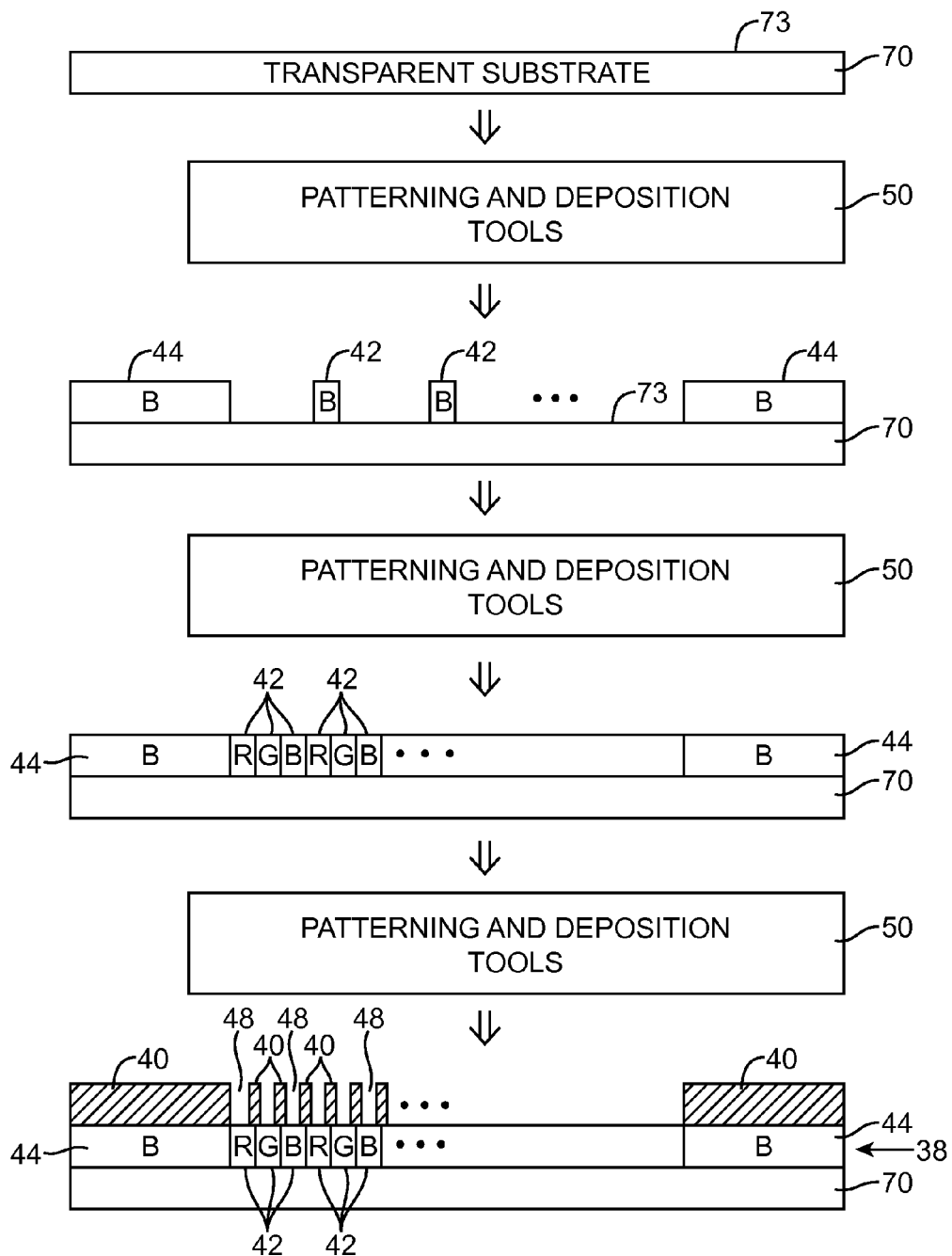
FIG. 6 is a diagram showing how an opaque masking layer may be formed over a peripheral color filter in an inactive portion of a display in accordance with an embodiment of the present invention.

FIG. 6 is a diagram showing how patterning and deposition tools may be used to form layer 30 on surface 73 of layer 70.

As shown in FIG. 6, a transparent substrate such as transparent substrate 70 (e.g., a glass sheet) may be provided. Color filter formation tools such as patterning and deposition tools 50 (e.g., deposition equipment, photolithography equipment, computing equipment, computer controlled positioning equipment, etc.) may be used to deposit a layer of colored photoresist (e.g., blue photoresist) on a surface of the substrate and to remove portions of the deposited layer (e.g., using ultraviolet light) to form blue color filter elements 42 and blue peripheral color filter material 44 that at least partially surrounds the blue color filter elements on the substrate.

Patterning and deposition tools 50 may then be used to deposit and pattern color filter elements 42 of additional colors (e.g., red color filter elements and green color filter elements) on the substrate.

Patterning and deposition tools 50 may then be used to deposit a layer of opaque masking material over color filter elements 42 and peripheral color filter material 44 and to form openings 48 in the layer of opaque masking material. An opening 48 may be formed over each color filter element 42.

Figure 7:
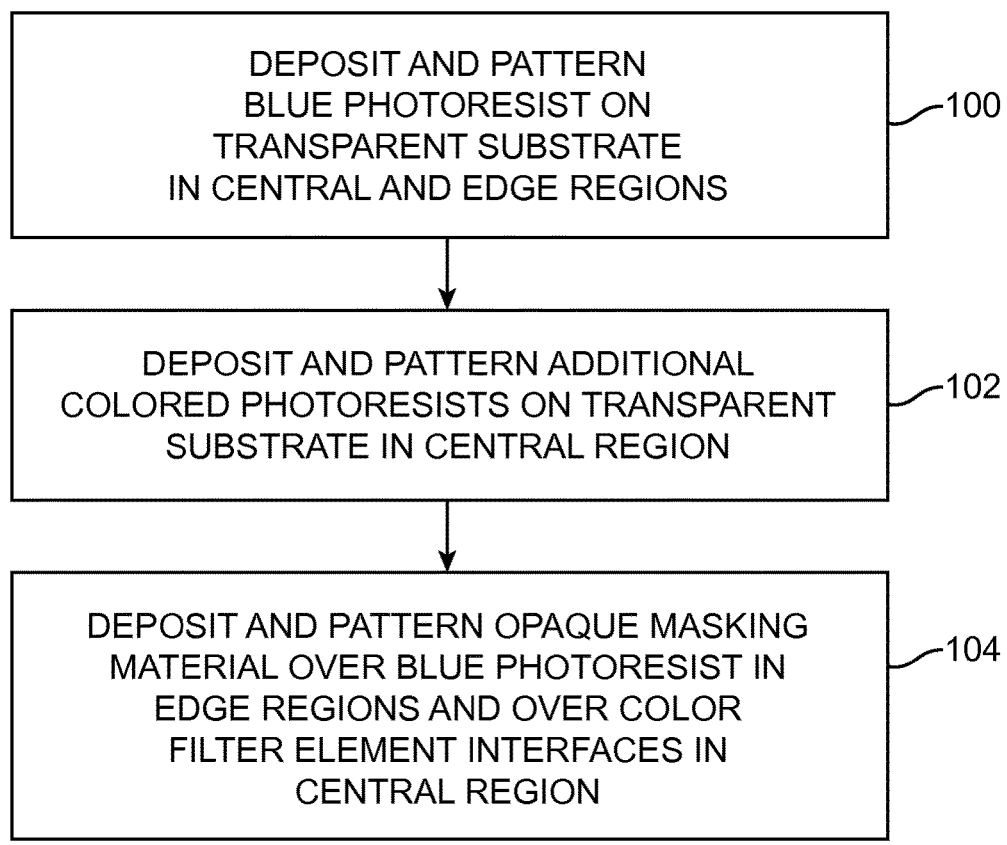
FIG. 7 is a flow chart of illustrative steps involved in forming an opaque masking layer over a peripheral color filter in an inactive portion of a display in accordance with an embodiment of the present invention.

Illustrative steps that may be used in forming a display having a color filter layer of the type shown in, for example, FIG. 5 are shown in FIG. 7.

At step 100, color filter material of a first color (e.g., blue color filter material such as blue photoresist) may be deposited and patterned on a transparent substrate (e.g., a glass sheet). The color filter material of the first color may be deposited and patterned to form color filter elements of the first color in portions of the substrate to be used for a central active region of a device display and to form additional color filter material of the first color in portions of the substrate to be used for a peripheral inactive border portion of the device display.

At step 102, color filter material of additional colors (e.g., red and green color filter material such as red and green photoresist) may be deposited and patterned on the transparent substrate. For example, red color filter material may be deposited and patterned to form red color filter elements in the portions of the substrate to be used for the central active region of the device display.

Following formation of the red color filter elements, green color filter material may be deposited and patterned to form green color filter elements in the portions of the substrate to be used for the central active region of the device display. However, this is merely illustrative. If desired, color filter materials of other colors may be deposited and patterned on the substrate and/or other orders may be used for formation of the color filter elements (e.g., the green color filter elements may be formed before the red color filter elements).

At step 104, opaque masking material (e.g., black ink) may be deposited over the color filter material on the substrate. The opaque masking material may then be patterned to form openings in the opaque masking material over at least a portion of each color filter element in the portions of the substrate to be used for the central active region of a device display. In this way, a color filter layer for a device display may be formed having a black matrix of opaque masking material over interfaces between color filter elements and opaque masking material over a peripheral color filter of substantially one color in a peripheral edge region of the color filter layer.

In accordance with an embodiment a display is provided that includes a transparent substrate having a surface, an array of display pixels configured to display images in an active portion of the display, where the active portion of the display is surrounded by an inactive portion of the display, an array of color filter elements on the surface of the transparent substrate that are aligned with the display pixels in the active portion of the display, color filter material having a single color that covers the entire surface of the transparent substrate in the inactive portion of the display, and a layer of opaque masking material that covers at least the color filter material having the single color in the inactive portion of the display.

In accordance with another embodiment, the color filter material having the single color includes blue color filter material.

In accordance with another embodiment, the blue color filter material includes blue photoresist.

In accordance with another embodiment, at least some of the layer of opaque masking material forms a matrix that covers interfacing portions of the color filter elements.

In accordance with another embodiment, the transparent substrate includes glass.

In accordance with another embodiment, at least some of the layer of opaque masking material forms a matrix that covers interfacing portions of the color filter elements.

In accordance with another embodiment, the display further includes a thin-film transistor layer and a layer of liquid crystal material interposed between the thin-film transistor layer and the color filter elements on the surface of the transparent substrate.

In accordance with another embodiment, the display further includes backlight structures that generate backlight for the display.

In accordance with an embodiment, a method of forming a display for an electronic device is provided that includes depositing color filter material having a color on a surface of a transparent substrate, patterning the deposited color filter material to form color filter elements on a first portion of the transparent substrate that is to be used for an active portion of the display, patterning the deposited color filter material to form a peripheral color filter that completely covers a second portion of the transparent substrate that is to be used for an inactive portion of the display, forming additional color filter elements of at least one additional color on the first portion of the transparent substrate, and forming opaque masking material over the peripheral color filter that completely covers the second portion of the transparent substrate.

In accordance with another embodiment, forming the opaque masking material over the peripheral color filter that completely covers the second portion of the transparent substrate includes depositing a layer of the opaque masking material over the color filter elements, the additional color filter elements, and the peripheral color filter and patterning openings in the deposited layer of the opaque masking material.

In accordance with another embodiment, depositing the color filter material having the color on the surface of the transparent substrate includes depositing blue color filter material on the surface of the transparent substrate.

In accordance with another embodiment, forming the additional color filter elements of at least one additional color on the first portion of the transparent substrate includes forming red color filter elements on the first portion of the transparent substrate.

In accordance with another embodiment, forming the additional color filter elements of at least one additional color on the first portion of the transparent substrate further includes forming green color filter elements on the first portion of the transparent substrate.

In accordance with another embodiment, patterning the openings in the deposited layer of the opaque masking material includes forming at least one opening over each of the blue color filter elements, the red color filter elements, and the green color filter elements.

In accordance with an embodiment, a display is provided that includes a thin-film transistor layer, a color filter layer, and a layer of liquid crystal material interposed between the thin-film transistor layer and the color filter layer, where the color filter layer includes a plurality of color filter elements in a central region of the color filter layer, a rectangular color filter ring that surrounds the plurality of color filter elements, and a patterned layer of opaque material that covers at least the rectangular color filter ring.

In accordance with another embodiment, the thin-film transistor layer includes a substrate having a central region that is aligned with the central region of the color filter layer and thin-film transistor circuitry on the substrate in the central region.

In accordance with another embodiment, the thin-film transistor layer further includes a plurality of data lines and a plurality of gate lines in the central region.

In accordance with another embodiment, the substrate includes glass.

In accordance with another embodiment, the thin-film transistor circuitry includes polysilicon transistor circuitry.

In accordance with another embodiment, the thin-film transistor circuitry includes amorphous silicon transistor circuitry.

The foregoing is merely illustrative of the principles of this invention and various modifications can be made by those skilled in the art without departing from the scope and spirit of the invention.

What is claimed is:

1. An electronic device having a front surface and edge surfaces, the electronic device comprising:
    a housing that forms the edge surfaces; and
    a display that extends edge-to-edge across the entire front surface of the electronic device, the display comprising:
        a transparent substrate having a surface;
        an array of display pixels configured to display images in an active portion of the display, wherein the active portion of the display is surrounded by an inactive portion of the display, and wherein the active portion and the inactive portion form the entire display;

an array of color filter elements on the surface of the transparent substrate that are aligned with the display pixels in the active portion of the display;

color filter material having a single color that covers the entire surface of the transparent substrate in the inactive portion of the display; and a layer of black masking material that covers and directly contacts at least the color filter material having the single color in the inactive portion of the display, wherein the layer of black masking material is formed from a different material than the color filter material, and wherein the color filter material is interposed between the transparent substrate and the layer of black masking material to reduce reflections in the inactive portion of the display.

2. The display defined in claim 1 wherein the color filter material having the single color comprises blue color filter material.

3. The display defined in claim 2 wherein the blue color filter material comprises blue photoresist.

4. The display defined in claim 3 wherein at least some of the layer of black masking material forms a matrix that covers interfacing portions of the color filter elements.

5. The display defined in claim 3 wherein the transparent substrate comprises glass.

6. The display defined in claim 1 wherein at least some of the layer of black masking material forms a matrix that covers interfacing portions of the color filter elements.

7. The display defined in claim 6, further comprising:
a thin-film transistor layer; and
a layer of liquid crystal material interposed between the thin-film transistor layer and the color filter elements on the surface of the transparent substrate.

8. The display defined in claim 7, further comprising:
backlight structures that generate backlight for the display.

9. An electronic device having a front surface and side surfaces, the electronic device comprising:
a housing that forms the side surfaces; and
a display that extends edge-to-edge across the entire front surface of the electronic device, the display comprising:
a thin-film transistor layer;
a color filter layer; and
a layer of liquid crystal material interposed between the thin-film transistor layer and the color filter layer, wherein the color filter layer comprises a plurality of color filter elements in a central active region of the color filter layer, a rectangular color filter ring that surrounds the plurality of color filter elements and completely covers an inactive region of the color filter layer that surrounds the central active region, and a patterned layer of black masking material that completely covers and directly contacts the rectangular color filter ring and overlaps the color filter elements in the central active region of the color filter layer, wherein the patterned layer of black masking material is formed from a different material than the rectangular color filter ring, wherein the rectangular color filter ring is interposed between the color filter layer and the patterned layer of black masking material to reduce reflections in the inactive region, and wherein the entire display is covered by the rectangular color filter ring, the plurality of color filter elements, and the patterned layer of black masking material.

10. The display defined in claim 9 wherein the thin-film transistor layer comprises:
a substrate having a central region that is aligned with the central active region of the color filter layer; and
thin-film transistor circuitry on the substrate in the central region.

11. The display defined in claim 10 wherein the thin-film transistor layer further comprises a plurality of data lines and a plurality of gate lines in the central region.

12. The display defined in claim 11 wherein the substrate comprises glass.

13. The display defined in claim 10 wherein the thin-film transistor circuitry comprises polysilicon transistor circuitry.

14. The display defined in claim 10 wherein the thin-film transistor circuitry comprises amorphous silicon transistor circuitry.

15. A method of forming a display for an electronic device, comprising:
depositing color filter material having a color on a surface of a transparent substrate;
patterning the deposited color filter material to form color filter elements on a first portion of the transparent substrate that is to be used for an active portion of the display;
patterning the deposited color filter material to form a peripheral color filter that completely covers a second portion of the transparent substrate that is to be used for an inactive portion of the display;
forming additional color filter elements of at least one additional color on the first portion of the transparent substrate; and
forming black masking material directly on the peripheral color filter that completely covers the second portion of the transparent substrate, wherein the black masking material is formed from a different material than the peripheral color filter, wherein the peripheral color filter is interposed between the transparent substrate and the black masking material to reduce reflections in the inactive portion of the display, and wherein the color filter elements, peripheral color filter, additional color filter elements, and black masking material completely cover the transparent substrate.

16. The method defined in claim 15 wherein forming the black masking material directly on the peripheral color filter that completely covers the second portion of the transparent substrate comprises:
depositing a layer of the black masking material over the color filter elements, the additional color filter elements, and the peripheral color filter; and
patterning openings in the deposited layer of the black masking material.

17. The method defined in claim 16 wherein depositing the color filter material having the color on the surface of the transparent substrate comprises depositing blue color filter material on the surface of the transparent substrate to form blue color filter elements.

18. The method defined in claim 17 wherein forming the additional color filter elements of at least one additional color on the first portion of the transparent substrate comprises forming red color filter elements on the first portion of the transparent substrate.

19. The method defined in claim 18 wherein forming the additional color filter elements of at least one additional color on the first portion of the transparent substrate further comprises forming green color filter elements on the first portion of the transparent substrate.

20. The method defined in claim 19 wherein patterning the openings in the deposited layer of the black masking material comprises forming at least one opening over each of the blue color filter elements, the red color filter elements, and the green color filter elements.

* * * * *